United States Patent
Masters et al.

(10) Patent No.: US 7,845,299 B2
(45) Date of Patent: Dec. 7, 2010

(54) COMPLIANT BANDING SYSTEM

(75) Inventors: Rodney H. Masters, Houston, TX (US); Cecil M. Brandon, Jr., Spring, TX (US); Stuart John Harbert, Houston, TX (US); Kurt D. Vandervort, Cypress, TX (US); Bill Griffith, Houston, TX (US)

(73) Assignee: VIV Suppression, Inc., Houston, TX (US)

( * ) Notice: Subject to any disclaimer, the term of this patent is extended or adjusted under 35 U.S.C. 154(b) by 0 days.

(21) Appl. No.: 11/694,620

(22) Filed: Mar. 30, 2007

(65) Prior Publication Data

US 2008/0236469 A1 Oct. 2, 2008

(51) Int. Cl.
*F15D 1/10* (2006.01)
(52) U.S. Cl. ..................................................... 114/243
(58) Field of Classification Search ................. 114/243; 405/211, 216; 24/16 PB, 16 R, 19, 20 R; 285/236, 110, 364–367, 420; 277/607
See application file for complete search history.

(56) References Cited

U.S. PATENT DOCUMENTS

| | | | | |
|---|---|---|---|---|
| 1,942,489 | A | * | 1/1934 | Pfefferle ...................... 277/631 |
| 2,227,551 | A | * | 1/1941 | Morris ......................... 285/373 |
| 2,925,551 | A | * | 2/1960 | Segesman .................... 324/373 |
| 2,928,411 | A | * | 3/1960 | Johnson .................... 137/236.1 |
| 3,177,015 | A | * | 4/1965 | Brown ......................... 285/236 |
| 3,249,685 | A | * | 5/1966 | Heflin, Jr. ................... 277/607 |
| 3,334,928 | A | * | 8/1967 | Schmunk .................... 285/110 |
| 4,312,101 | A | * | 1/1982 | Oetiker ....................... 24/20 R |
| 6,364,575 | B1 | * | 4/2002 | Bradley et al. .............. 405/216 |
| 6,896,447 | B1 | * | 5/2005 | Taquino ...................... 405/216 |

* cited by examiner

*Primary Examiner*—Ed Swinehart
(74) *Attorney, Agent, or Firm*—Edmonds & Nolte, P.C.

(57) ABSTRACT

The present invention discloses a compliant banding system for use in a marine environment comprising a flexible compliant member and an abaxial relatively rigid strap, both constructed to extend circumferentially around an underlying structure such as a strake or fairing collar. The strap maintains a fixed circumference while the compliant member flexes intermediate the strap and an underlying.

16 Claims, 4 Drawing Sheets

COMPLIANT BANDING SYSTEM

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

The present invention relates to fasteners in general, and more particularly to a banding system for use in securely attaching strakes and fairings onto cylindrical structures used in the offshore industry.

2. Description of the Related Art

Vortex-induced vibrations (VIVs) are a concern in the offshore industry where elongated structures, such as tension leg platforms, spars, etc., are utilized. VIVs may be generated when fluid flows past an elongated structure. As current flows past a structure, friction at the structure/fluid interface slows proximal fluid flow. Vortex eddies result from the differential fluid velocity of the proximal and distal fluid flow.

Floating structures possess long, cylindrical components, such as steel catenary risers (SCRs), tendons, cables, flowlines, pipelines, among others, that are sensitive to VIVs resulting from ocean currents. VIVs have been shown to greatly reduce the life span of cylindrical structures.

Vortex-induced vibration suppression devices have been developed in order to combat VIVs. Vortex strakes consist of a generally elongated cylindrical shell that typically contains three fins running longitudinally along the outside surface. These fins define a three-start helical pattern that spirals around the shell in a set period or frequency. The primary function of the fins is to prevent formation of vortex eddies by disrupting the current flow. Vortex strakes are typically firmly attached to the cylindrical structure in need of protection and are not permitted to rotate.

Fairings are typically a tear-dropped or U-shaped device that function by weathervaning along with the current flow in order to disrupt the current flow and prevent the formation of vortex eddies. The fairings encapsulate the cylindrical structure to be protected. The weathervane function of the fairing is essential. For this reason the fairings are not snuggly affixed to the cylindrical structure. Thus a thrust collar is required to maintain the fairings elevation. The thrust collar is fixedly attached to the cylindrical structure to prevent the fairings from unintentionally migrating along the length of the cylindrical structure.

A majority of the cylindrical structures, i.e., SCRs, flowlines, pipelines, etc., are coated with a thermally insulating material to decrease the resistance to flow typically encountered due to the frigidness of the working environment. Typically these cylindrical structures are required to function at water temperatures as low as 1.67° C. to 4.44° C. (35° F.-40° F.). The insulation is utilized to prevent heat loss from the inside of the cylindrical structures in order to keep the production material flowing at higher rates and to prevent freezing or the formation of hydrates as the case may be.

Several different types of insulation materials are utilized in the deep-water offshore oil and gas industry. The most common material is a glass-sphere syntactic epoxy foam (GSE), this is an epoxy resin that is blended with hollow glass spheres containing air to increase their insulating properties. Although epoxies provide excellent insulating characteristics, they are also stiff, brittle and inflexible. GSEs have fractured, cracked and broken away from the cylindrical structures they were insulating due to their brittleness. These occurrences permit desirable heat to escape from the cylindrical structures contents typically causing a slow down in production.

Glass-sphere syntactic polyurethane insulation (GSPU) has risen in popularity due to its flexibility, which in turn resists cracking or breaking while utilizing current pipeline laying techniques. However, as a natural byproduct of this desired increase in flexibility the naturally occurring hydrostatic pressure exerted by the water, that has no discernible effect on the stiff, inflexible epoxy resin, actually compresses the GSPU at great depths causing a decrease in the outer diameter. Vortex strakes or fairings are typically installed onto the thermally insulated cylindrical structures on the deck of pipe-laying barges prior to deployment. Typically, this attachment is achieved with the use of widely used corrosion resistant banding material. Although this procedure is sufficient when GSE is used as the insulator, it is impractical when utilizing the more desirable GSPU insulation.

Once these typical fasteners are used and the cylindrical structure is placed into the water, the hydrostatic pressure will begin to affect the outer diameter of the cylindrical structure. The bands, which were correctly tightened at the ocean's surface, become loose due to the ensuing hydrostatic pressure at lower depths. The strakes are then free to rotate along with the current, slide along the cylindrical structure, and/or become inter-tangled with other strakes, all of which are not desirable. Hydrostatic pressure also affects the thrust collars of fairings installed over GSPU insulation allowing the fairings to move along the length of the cylindrical structure away from the area where the fairings are needed.

During a typical installation, risers can be, and are usually, placed on the ocean floor where they typically remain for months at a time prior to their final installation. Risers are subjected to cold-water temperatures and hydrostatic pressure that results in compression of the insulation material. Typical banding material is ill-equipped to handle this resultant compression. Once the risers are raised for installation, typical bands will allow the strakes and/or fairings to undesirably travel along the riser due to their resultant slackness, allowing the strakes and/or fairing to move from the desired position. Further, once the risers are correctly positioned and production begins, the risers tend to heat and expand from their original cold position. Conventional bands are as inflexible with outward extension as they are with compression and are not able to fully function in these standard installation and production conditions.

Flaws in mainstream bands are also apparent during hurricane conditions when wells are typically shut down. The shut down effectively halts production and clears the lines of flowing product. Once this shut down occurs the affected pipelines tend to cool causing compression of the insulation. Again, standard bands cannot compensate for the resultant changes in diameter that occur due to this compression nor with the resultant expansion that will occur once the well is reinitialized. These shortcomings result in the movement, or further movement, of the attached strakes and/or fairings from a desired position.

It would be an improvement to the art to have a compliant banding system that is able to maintain sufficient tension at different depths in order to securely hold a vortex strake or a fairing collar to a cylindrical structure when hydrostatic pressure is affecting the outer diameter of the structure.

It would be a further improvement in the art to have a compliant banding system that is able to maintain sufficient tension without overstressing the straps should there be an increase in temperature inside the cylindrical structure causing the outer diameter to increase.

It would be a further improvement in the art to reduce the time required to install vortex-induced vibration inhibitors on cylindrical structures.

It would be a further improvement in the art to allow for competitive pricing when attempting to secure projects in the offshore oil and gas industry.

BRIEF SUMMARY OF THE INVENTION

Accordingly, it is an object of the present invention to provide a compliant banding system with the ability to expand and contract with changes in diameter of the underlying structure, whether due to hydrostatic pressure, thermal expansions, internal operating pressures, or the like.

The present invention comprises a compliant banding system for use with vortex strakes or fairing collars, such compliant banding system having a fixed outer diameter and an inner diameter that expands and contracts with changes in the diameter of the strakes or fairing collars.

The compliant banding system of the present invention comprises a compliant member, an attached channel member and a strap extending through the channel, all constructed to extend circumferentially around a strake or fairing collar. The strap is moveable within the channel and may be attached to itself to define a fixed circumference. Opposing first and second retainer segments extend the length of the channel member. The retainer segments partially enclose the strap within the channel of the channel member effectively preventing dislodgment of the strap. The compliant member is positioned adaxially and is constructed of a flexible material such as polyether based polyurethane. Accordingly, the compliant member is flexible within determined ranges intermediate the underlying structure and the fixed-circumference strap.

The compliant member's shape aids in properly retaining the compliant band to the strake or fairing collar. The compliant member is arcuate proximate its adaxial surface and wider proximate the channel. The flexible material provides the requisite springiness to the system to allow for the appropriate expansion or compression necessary to properly retain the strakes and/or fairings to the subject structure.

Indicators are provided on the channel member extending adaxially external the compliant member to allow visual observation of extent of compression of the compliant member. The compression indicators may be used to prevent rolling of the compliant band due to eccentric loading. Compression indicators may further be used to allow visual observation of when proper tension has been achieved at installation of the compliant band.

In an exemplary embodiment, the fastening mechanism includes a crimp seal clip and a solid spacer.

Other features and advantages of the invention will be apparent from the following description, the accompanying drawings and the appended claims.

BRIEF DESCRIPTION OF THE DRAWINGS

For a more complete understanding of the present invention and the advantages thereof, reference is now made to the following Detailed Description of an Example Embodiment of the Invention, taken in conjunction with the accompanying drawings, in which.

DESCRIPTION OF THE INVENTION

Figure 1:
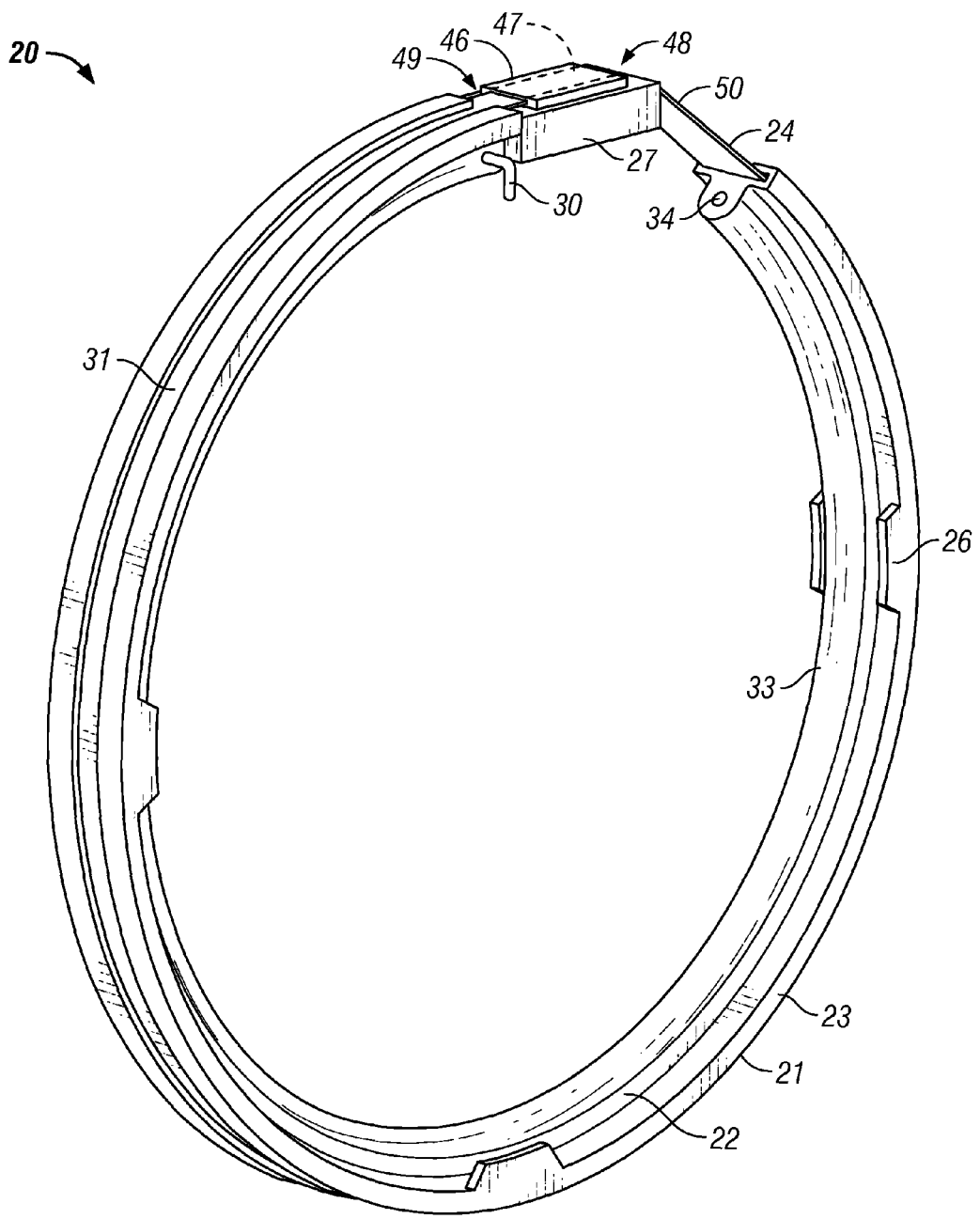
FIG. 1 is a perspective view of the preferred embodiment of the present invention.

The invention and its advantages are best understood by referring to the drawings, like numerals being used for like and corresponding parts of the various drawings. FIGS. 1-4 show the preferred embodiment of the compliant banding system 20 of the present invention.

Referring to FIG. 1, compliant banding system 20 includes compliant band 21 comprising compliant member 22 attached to channel member 23. Channel member 23 defines channel 31. A strap 24 extends through channel 31. Solid spacer 27 is removably attached to compliant member 22 by sacrificial pin 30. Compression indicators 26 are provided on channel member 23.

Compliant band 21 is constructed to extend circumferentially around a structure such as a strake or fairing collar (not shown).

Figure 2:
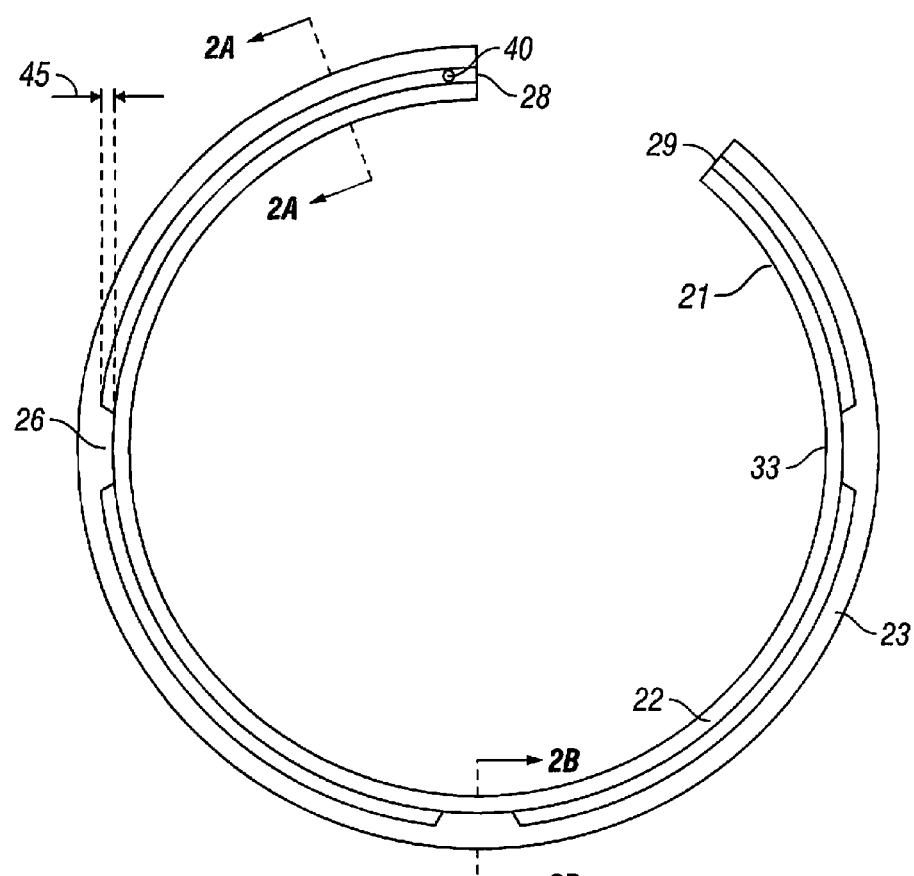
FIG. 2 is a side view of the present invention.

Referring to FIGS. 1 and 2, in an exemplary embodiment, interior cavity 34 extends through compliant band 21. Interior cavity 34 enhances the flexibility of the compliant band 21.

Figure 2A:
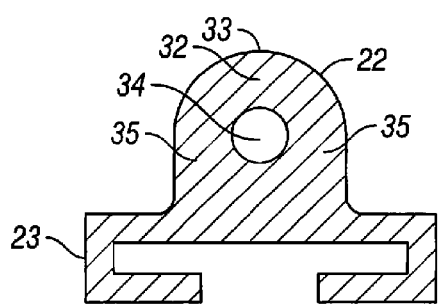
FIG. 2A is a cross-sectional view of the indicated section 2A-2A of FIG. 2.

Referring to FIG. 2, compliant member 22 is positioned adaxially. FIG. 2A shows a cross-section at A-A of FIG. 2. Compliant member 22 contains a contact surface 33 positioned intermediate sidewalls 35. Compliant member 22 is connected to channel member 23 distal contact surface 33. In the exemplary embodiment depicted, the compliant member 22 is arcuately tapered intermediate sidewall 35 and contact surface 33. Because of the lesser cross-sectional area of contact surface 33 in relation to the cross-sectional area intermediate sidewalls 35, less pressure is required to compress contact surface 33 than the area intermediate sidewalls 35, allowing a wider range of compressive and expansive movement of compliant member 22 proximate contact surface 33 than intermediate sidewalls 35.

In an exemplary embodiment, interior cavity 34 is provided in compliant member 22 extending longitudinally along the length of compliant member 22 (and extending circumferentially with compliant member 22 when compliant member 22 is circularly positioned). Accordingly, interior cavity 34 proximate contact surface 33 defines an arcuate wall 32 extending intermediate sidewalls 35. In the exemplary embodiment arcuate wall 32 defines a partial cylinder structure.

Figure 2B:
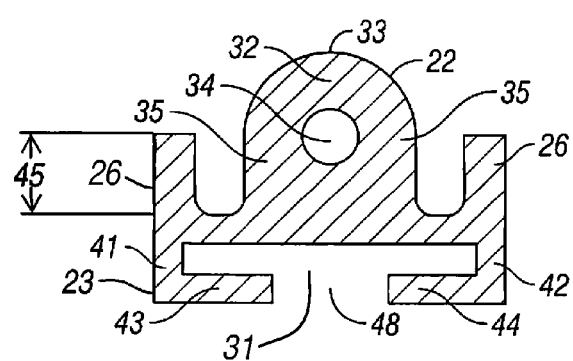
FIG. 2B is a cross-sectional view of the indicated section 2B-2B of FIG. 2.
Figure 2C:
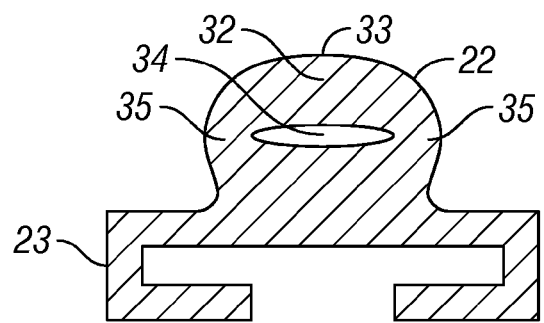
FIG. 2C is a cross-sectional view of the indicated section 2A-2A in a compressed position.

Interior cavity 34 and flexible arcuate wall 32 accordingly allows a range of flexibility from the generally circular opening of interior cavity 34 as depicted in FIG. 2A to a flattened arcuate wall 32 wherein interior cavity 34 is compressed to be essentially flat as depicted in FIG. 2C.

In an alternative embodiment (not shown), compliant member 22 is constructed without interior cavity 34. In such alternative embodiment, greater stiffness can be obtained than the embodiment with interior cavity 34, but the range of movement in relation to expansion and contraction of the underlying structure is more limited.

Figure 3:
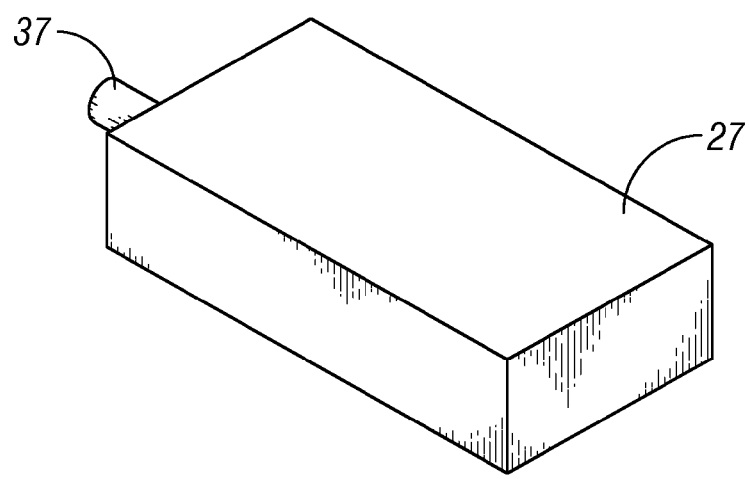
FIG. 3 is a skewed side view of the solid spacer and alignment peg.
Figure 3A:
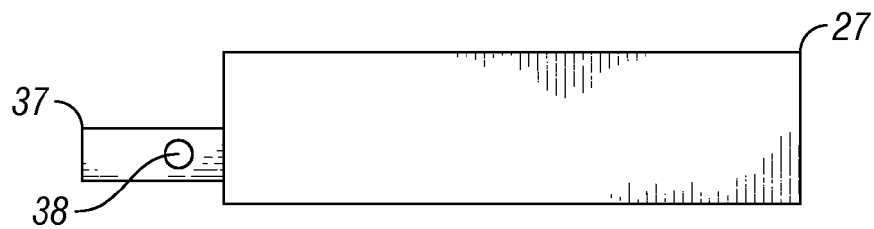
FIG. 3A is a side view of the solid spacer and alignment peg.
Figure 3B:
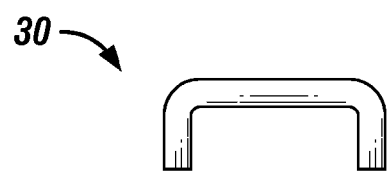
FIG. 3B is a side view of the sacrificial pin.

Referring to FIGS. 3, 3A and 3B, solid spacer 27, alignment peg 37, pin orifice 38 and sacrificial pin 30 are depicted. Alignment peg 37 is a generally cylindrical protrusion extending from one end of solid spacer 27 generally parallel to the longitudinal axis thereof. Alignment peg 37 is inserted into interior cavity 34 at first end 28 of compliant band 21 prior to installation of compliant banding system 20 onto a strake or fairing collar. Pin orifice 38 extends through alignment peg 37, perpendicular to alignment peg axis 37, proximate solid spacer 27. Compliant band pin orifice 40, shown in FIG. 2, extends through compliant member 22 of compliant band 21 perpendicular to the longitudinal axis of compliant member 22 and proximate first end 28.

In operation, alignment peg 37 may be inserted through first end 28 so that pin orifice 38 is aligned with compliant band pin orifice 40 allowing sacrificial pin 30 to be inserted through the single continuous orifice defined by pin orifice 38 and compliant band pin orifice 40.

Sacrificial pin 30 is a generally elongated cylindrical member that is inserted through pin orifice 38 and compliant band pin orifice 40 when alignment peg 37 is properly inserted into interior cavity 34 at first end 28. Once alignment peg 37 is inserted into interior cavity 34 at first end 28, first end 28 abuts the end of solid spacer 27 containing alignment peg 37. In an exemplary embodiment, sacrificial pin 30 is constructed of plastic.

Alignment peg 37 is utilized to align solid spacer 27 with compliant band 21 to aid in proper installation. Solid spacer 27 acts as an anti-rotational device that prevents compliant band 21 from rolling over during the installation process.

Referring to FIGS. 1 and 2B, compliant band 21 further comprises channel member 23 attached to compliant member 22 distal or opposite contact surface 33. Channel member 23 contains a first projection 41 and a second projection 42. Channel 31 is located intermediate first projection 41 and second projection 42. First projection 41 and second projection 42 extend longitudinally along the length of the compliant band 21 (and circumferentially when compliant band 21 is formed circularly). First projection 41 and second projection 42 are positioned abaxially. In an exemplary embodiment, first projection 41 and second projection 42 both contain an inward-extending lip 43 and 44. Lips 43 and 44 defining an installation opening 48 to allow strap 24 to be inserted into channel 31. Upon installation of strap 24, lips 43 and 44 limit movement of strap 24 allowing retention of strap 24 within channel 31.

Further referring to FIG. 1, strap 24 comprises an elongated strip that can be formed to extend circumferentially around compliant member 22. Strap 24 may be constructed of metal or other materials having appropriate tensile strengths and is preferably constructed of a corrosion resistant material. Preferably the material can remain submerged in seawater for long periods of time without deteriorating to a point where strap 24 would no longer be effective. In an exemplary embodiment Inconel® 625 is the material used for strap 24. (Inconel is a registered trademark of Inco Alloys International, Inc.). Strap 24 is retained within channel 31 and extends along the longitudinal length of compliant band 21. Strap 24 is moveable within channel 31. Once secured, strap 24 defines a fixed circumference.

Referring to FIGS. 1, 2 and 2B, compression indicators 26 are provided on channel member 23. Compression indicators 26 extend adaxially from compliant band 21 external of compliant member 22. In the exemplary embodiment shown in FIG. 2 and FIG. 2B, compliant member 22 is intermediate pairs of compression indicators 26.

Compression indicators 26 provide a visual indication of appropriate compression of compliant member 22 during the installation process. Compression indicators 26 may be constructed with a desired protrusion length 45 to allow the installer of the compliant band system 20 to visually determine the extent of compression of compliant member 22 at installation.

Additionally, aligned compression indicator 26 pairs may prevent rolling of the compliant band 21 in the event of eccentric loading. In the exemplary embodiment depicted, compliant banding system 20 contains three pairs of compression indicators 26.

Referring to FIG. 1, crimp seal clip 46 is fixedly attached to the end of strap 24 proximate solid spacer 27. Crimp seal clip 46 contains an inner channel 47 that extends from insert end 48 through to exit end 49. Inner channel 47 is slightly larger than strap 24, such that fastening end 50 of strap 24 may be inserted within and through inner channel 47.

First projection 41 and second projection 42 prevent strap 24 from dislodging from compliant banding system 20 during installation. In an exemplary embodiment, crimp seal clip 46 is made of a corrosion resistant material having suitable strength to retain strap 24 in a fixed position. In an exemplary embodiment, crimp seal clip 46 is constructed of Inconel® 625.

Preferably, crimp seal clip 46 and strap 24 are fabricated as one continuous piece. Preferably, compliant band 21 is constructed of a seawater resistant, flexible material possessing a low compression set, such as polyether based polyurethane. Such characteristics allow compliant member 22 to expand and contract in response to variation in the diameter of the underlying structure. In an exemplary embodiment, the compliant band 21 is constructed of a material having an 80 to 90 shore A rating with a compression set of 25% or less.

Preferably, compliant band 21, compliant member 22, channel member 23 and compression indicators 26 are unitarily constructed.

Installation of compliant banding system 20 can be achieved in many environments. Typically the installation will occur onsite. Once the strake or fairing collar is in position on the cylindrical structure to be protected from VIVs, compliant banding system 20 is placed at the appropriate installation location 52. In the exemplary embodiment depicted in FIG. 4 compliant banding systems 20 are depicted installed at three installation locations 52 on strake 25.

Compliant band 21 is installed on strake 25 such that contact surface 33 of compliant member 22 abuts strake surface 54.

Figure 4:
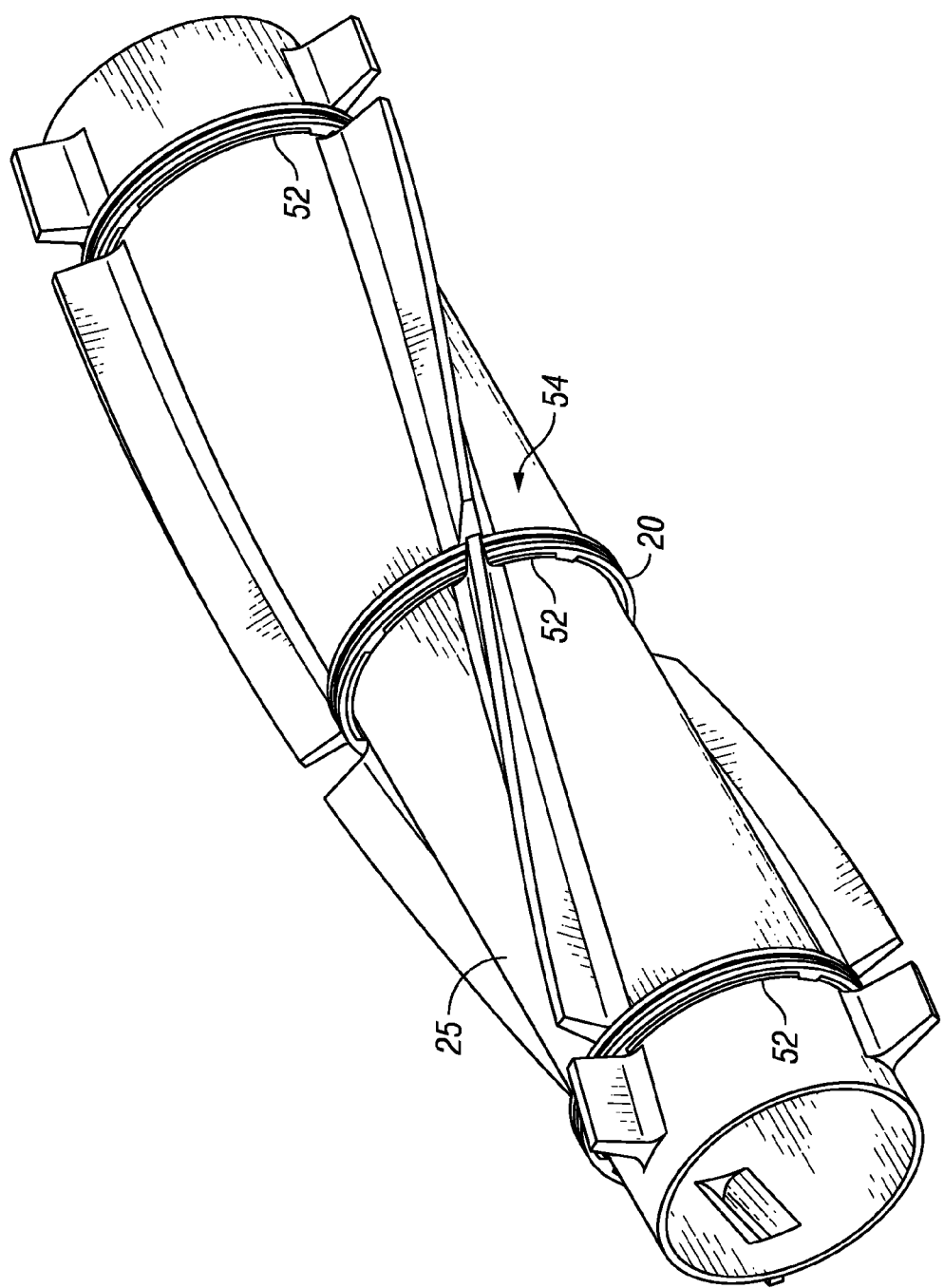
FIG. 4 is a perspective view of a preferred embodiment of the present invention as installed on a strake.

Referring to FIGS. 1 and 4, fastening end 50 of strap 24 is inserted into and through insert end 48 of crimp seal clip 46. Strap 24 is then tightened to induce tension into compliant band 21. Crimp seal clip 46 and the method of tightening same are commercially practiced methods of strap tightening.

Alternatively, proper tension may be monitored by observing compression indicators 26 as described above.

As strap 24 is tightened, contact surface 33 is compressed against strake surface 54 and, when sufficient pressure is applied the compliant member 22 will compress. As arcuate wall 32 flexes, interior cavity 34 flattens.

When desired tension is achieved in compliant banding system 20, crimp seal clip 46 is crimped to secure strap 24 in a fixed circumference around compliant member 22. Crimping of crimp seal clip 46 may be achieved utilizing a commercially available crimping tool. When compliant banding system 20 is in a closed position, spacer 27 is intermediate compliant member ends 28 and 29.

Upon installation, strap 24 provides a relatively fixed circumference of the compliant banding system 20 abaxially of the compliant member 22. Compliant member 22 conforms to fluctuations in diameter of the underlying structure. Specifically, compliant member 22 will flex intermediate the strake or fairing collar while strap 24 will hold the outer circumference of the compliant banding system 20 in a relatively fixed position.

The invention includes a method of retaining a vortex-induced vibration inhibitor (VIVI) on a structure. This method includes (1) installing a compliant banding system 20 comprising a compliant member 22 and an abaxial strap 24. Compliant member 22 and strap 24 are installed such that they encircle an outer surface of the VIVI. Once the VIVI is encircled with system 20, (2) a first end of strap 24 is fixedly attached to the second end of strap 24. This attaching step ensures the VIVI will remain properly retained against the structure.

Additional steps that may further enhance this standard method of retaining a VIVI on a structure may be performed synchronously or independently of each other. The standard method may be augmented by the insertion of strap 24 into channel 31 prior to encircling the outer surface of the VIVI. This prior insertion may serve to hasten the installation process. Crimping the ends of strap 24 with crimp seal clip 46 may further enhance the previously mentioned attaching step. Crimping the ends of strap 24 can aid in ensuring the tension in system 20 is retained during deployment. An alignment step may be utilized intermediate the encircling step and the attaching step discussed above. Alignment of first end 28 and second end 29 of compliant band 21 by implementing spacer 27 may ensure successful installation and placement of system 20 on the VIVI. Peg 37 may be employed to retain spacer 27 in its proper position.

The present invention, and many of its intended advantages, will be understood from the foregoing disclosure and description, and it will be apparent that, although the invention and its advantages have been described in detail, various changes, substitutions, and alterations may be made in the manner, procedure, and details thereof without departing from the spirit and scope of the invention, as defined by the appended claims, or sacrificing any of its material advantages. The present invention should only be limited by the following claims and their legal equivalents.

What is claimed is:

1. A method for retaining a vortex-induced vibration inhibitor on a structure, comprising:
    an encircling step comprising installing a compliant member around a vortex-induced vibration inhibitor, wherein said compliant member has a strap which contains a first end and a second end;
    an attaching step comprising fixedly attaching said first end of said strap to said second end of said strap; and
    inserting said strap in a channel of said compliant member prior to said encircling step.

2. The method of claim 1, further comprising:
    tightening said strap wherein a contact surface of said compliant member is compressed against the vortex-induced vibration inhibitor.

3. A method for retaining a vortex-induced vibration inhibitor on a structure, comprising:
    an encircling step comprising installing a compliant member around a vortex-induced vibration inhibitor, wherein said compliant member has a strap which contains a first end and a second end;
    an attaching step comprising fixedly attaching said first end of said strap to said second end of said strap; and
    an aligning step intermediate said encircling step and said aligning step comprising aligning a first compliant member end and a second compliant member end with a spacer.

4. The method of claim 3, wherein said aligning step further comprises inserting a spacer alignment peg in a compliant member interior cavity; and
    a monitoring step comprising monitoring compression indicators on said compliant member.

5. A retainer for a vortex-induced vibration inhibitor, comprising:
    a strap adjustable to a fixed circumference;
    a radically compliant member positioned adaxially in relation to said strap;
    an interior cavity provided within said compliant member;
    said compliant member having an inner contact surface opposite said strap;
    said compliant member having a first end and a second end;
    a spacer intermediate said first end and said second end;
    a strap fastening mechanism proximate said spacer;
    a channel member attached to said compliant member;
    at least one compression indicator disposed adaxially on said channel member;
    an alignment peg extending from said spacer, and
    said alignment peg receivable in said interior cavity.

6. The retainer of claim 5, wherein:
    said at least one compression indicator further comprises at least one opposed pair of compression indicators disposed adaxially on said channel member. said alignment peg receivable in said interior cavity.

7. A retainer for a vortex-induced vibration inhibitor, comprising:
    a strap adjustable to a fixed circumference and having separable first and second ends;
    a compliant member positioned adaxially in relation to said strap; wherein said compliant member has separable first and second ends, sidewalls, a contact surface intermediate said side walls, and a channel member distal said contact surface, wherein said channel member has a channel wherein said strap is receivable in said channel, wherein said channel member has at least one lip and wherein said compliant member has a decreasing cross-sectional area proximate said contact surface in relation to a cross-sectional area intermediate said sidewalls; and
    at least one compression indicator disposed adaxially on said channel member.

8. A retainer for a vortex-induced vibration inhibitor, comprising:
    a strap adjustable to a fixed circumference and having separable first and second ends;
    a compliant member positioned adaxially in relation to the strap; wherein said compliant member has separable first and second ends, sidewalls, a contact surface intermediate said side walls, and a channel member distal said contact surface; and
    at least one opposed pair of compression indicators disposed adaxially on said channel member.

9. The retainer of claim 8, further comprising:
    an interior cavity provided in said compliant member.

10. The retainer of claim 9, wherein said interior cavity extends longitudinally along the length of said compliant member.

11. The retainer of claim 8, further comprising:
    said compliant member having a decreasing cross-sectional area proximate said contact surface in relation to the cross-sectional area intermediate said sidewalls.

12. The retainer of claim 8, further comprising:
a spacer intermediate said separable first end and second end of said compliant member; and
a strap fastening mechanism proximate said spacer.

13. The retainer of claim 12, further comprising:
an alignment peg extending from said spacer;
an interior cavity provided in said compliant member; and
said alignment peg receivable in said interior cavity.

14. A retainer for a vortex-induced vibration inhibitor, comprising:
a strap adjustable to a fixed circumference;
a compliant member:
said compliant member positioned adaxially in relation to said strap;
said compliant member having a separable first end and second end;
an interior cavity within said compliant member; and
at least one opposed pair of compression indicators disposed adaxially on said channel member.

15. The retainer of claim 14, wherein said interior cavity extends longitudinally along the length of said compliant member.

16. The retainer of claim 14, further comprising:
said compliant member having a channel member with at least one lip; and
a spacer intermediate said separable first end and second end of said compliant member.

* * * * *